United States Patent [19]

Buskirk et al.

[11] 4,342,986

[45] Aug. 3, 1982

[54] CENTRAL STATION ALARM REPORTING SYSTEM

[75] Inventors: Allan F. V. Buskirk, Fountain Valley; Gadi Moskovitch, Anaheim, both of Calif.

[73] Assignee: Honeywell Inc., Minneapolis, Minn.

[21] Appl. No.: 147,689

[22] Filed: May 7, 1980

[51] Int. Cl.³ .................... G08B 26/00; H04Q 9/00
[52] U.S. Cl. .................... 340/539; 340/505; 340/506; 340/518; 340/531; 340/825.08; 340/825.10; 340/825.52; 340/825.54; 340/825.69; 179/5 R
[58] Field of Search .............. 340/539, 501, 503, 505, 340/506, 517, 518, 152 T, 151, 150, 531, 533, 534, 870.04, 870.16, 825.06, 825.12, 825.36, 825.39, 825.45–825.48, 825.52, 825.54, 825.69, 825.71, 825.72–825.74; 179/5 R, 2 R, 2 DP, 2 A, 2 AM; 455/9, 23

[56] References Cited

U.S. PATENT DOCUMENTS

| | | | |
|---|---|---|---|
| 3,381,276 | 4/1968 | James | 179/2 DP |
| 3,675,513 | 7/1972 | Flanagan et al. | 179/2 DP |
| 3,754,215 | 8/1973 | Blomenkamp | 340/151 |
| 3,823,308 | 7/1974 | Goldberg | 179/2 DP |
| 3,927,404 | 12/1975 | Cooper | 340/518 |
| 4,000,371 | 12/1976 | Ogawa | 179/2 DP |
| 4,014,004 | 3/1977 | Fuller | 340/152 T |
| 4,069,392 | 1/1978 | Goldenberg et al. | 179/2 DP |
| 4,079,414 | 3/1978 | Sullivan | 340/152 T |
| 4,162,488 | 7/1979 | Silverman et al. | 340/518 |

Primary Examiner—Thomas A. Robinson
Assistant Examiner—Donnie Lee Crosland
Attorney, Agent, or Firm—Trevor B. Joike

[57] ABSTRACT

A central station alarm reporting system having a remote premises unit which is polled by the central station using FSK messages and reports its alarm information in DTMF (dual tone multifrequency) messages wherein a plurality of parallel bits of information is reported by the remote premises unit using a transmission comprising two tones, one tone selected from a group of high frequencies and one tone selected from a group of low frequencies, and said central station decoding the tone transmission into its bits of information. For example, if four low frequencies and four high frequencies are used at the remote premises, then the central station provides four output lines which are capable of completely describing the sixteen combinations of four parallel bits of information which can be constructed when selecting two tones for a dual tone multifrequency transmission, one tone selectable from a group of four low frequencies and one tone selectable from a group of four high frequencies.

48 Claims, 16 Drawing Figures

CENTRAL STATION ALARM REPORTING SYSTEM

BACKGROUND OF THE INVENTION

This invention relates to a system for reporting alarms at remote premises to a central station and, more particularly, to the reporting of plural parallel bits of information via a tone transmission.

Central station systems have arisen to meet the needs of those commercial and residential establishements which are not large enough to provide their own alarm systems and security forces. Two forms of alarm reporting in central station applications were developed to service these remotely located customers. In the first or direct wire service, the alarm sensors for detecting such occurrences as unauthorized door openings, breakage of windows, and fires, were connected to a pair of telephone lines, dedicated specifically to that customer and extending to the central station. In the second or McCulloh service, a plurality of customers shared a common telephone line with sensors located at strategic points in each of the customers' premises and alarms occuring at any of the customers premises were reported in a coded format to identify the specific customer at which the alarm arose.

In both types of systems, an operator located at the central station monitored the signals received from the remote customer premises. If the current level on the dedicated wires in the direct wire system changed by greater than a specified percentage, an alarm for that remote premises would be given. In the McCulloh type system, if a code was received identifying a specific customer premises, again that remote customer premises was in alarm. In either case, the operator would contact the proper authorities to eliminate the condition which gave rise to the alarm.

These prior art type systems involved not only a complex communication network between the remote premises and the central station but also required complex equipment at the central station to process the information coming both over a multitude of inputs and in either the direct dedicated wire or the McCulloh formats. The Bell Systems are now providing a communication network which eliminates the duality of providing both direct dedicated wire and McCulloh systems and reduces the complexity of the communication system. The present invention is designed to use the Bell Systems equipment in a central station application for reporting alarms at remote premises to a central station and for providing certain control functions at the remote premises by messages generated at the central station.

SUMMARY OF THE INVENTION

The present invention relates to a system for transmitting at least two bits of parallel information in a single tone transmission comprising two tones selected from a group of four tones and a central station which provides a converter hving an input for receiving the tone transmission and at least two output lines for providing a binary representation completely describing all combinations of the tones selectble for the tone transmission.

BRIEF DESCRIPTION OF THE DRAWINGS

These and other features and advantages will become more apparent from a detailed consideration of the invention when taken in conjunction with the drawings in which.

DETAILED DESCRIPTION

Figure 1:
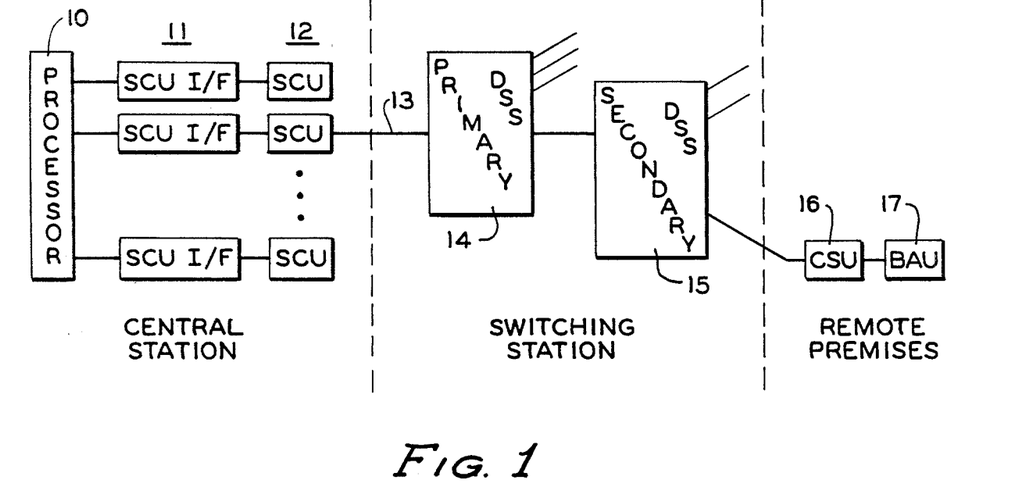
FIG. 1 is a generalized block diagram showing the equipment at the central station, the remote premises and the telephone switching station.

In FIG. 1, a central station includes processor 10 which may be comprised of the typical displays such as CRTs and printers, memory, and an 86/12 microprocessor which can be supplied by Intel using a standard Intel bus. The Intel bus connects up to eight selector control unit (SCU) interfaces 11 each one of which is connected to a respective selector control unit (SCU) 12. SCU 12 is supplied by the telephone company which also supplies four wire line 13 for connecting primary data station selector (DSS) 14 to the corresponding SCU 12. The primary DSS 14 in turn may be connected directly to the remote premises or may be connected to a secondary data station selector (DSS) 15 which in turn is connected to the remote premises. Secondary DSS 15 ma not in turn be connected through a third DSS to the remote premises. The two wire outputs from secondary DSS 15 are connected each to a remote premises one of which is shown in FIG. 1 and comprises channel service unit (CSU) 16 (supplied by the telephone company) connected between secondary DSS 15 and burglar alarm unit 17.

As mentioned previously, SCU 12, DSS 14, DSS 15 and CSU 16 are all supplied by the Bell System as its Dataphone Select-A-Station Service. Burglar alarm unit 17 is disclosed more fully in FIGS 4A-4D and SCU interface 11 is shown more fully in FIGS. 5A-5I.

In operation of the basic system shown in FIG. 1, processor 10 first addresses the specific SCU interface circuit 11 through which it wishes to communicate. Using primary stepping signals, processor 10 controls the stepping of primary data station selector 14 through the remote premise units connected to its two wire outputs pausing at each one for allowing the transmission of a polling signal from processor 10 to the remote unit and for the transmission of the remote unit message back to the central station. When the stepping of primary DSS 14 arrives at a secondary DSS 15, secondary stepping signals are supplied from processor 10 through the corresponding SCU interface 11, SCU 12, corresponding primary DSS 14 for stepping secondary DSS through each of the remote premises to which it is connected pausing at each one for the polling and alarm or status information to be transmitted between the central station and the remote premises.

Figure 2:
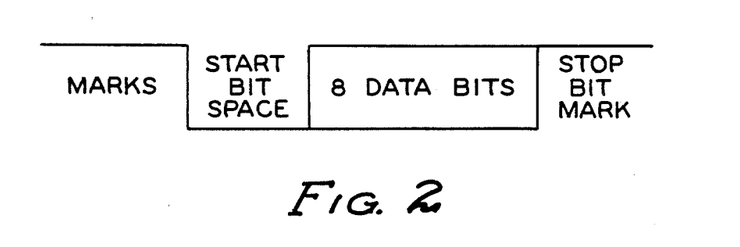
FIG. 2 shows the information format for the information communicated by the central station to the remote premises.

The central station uses a frequency shift keying data format (FSK). The FSK data is transmitted serially as shown in FIG. 2. The transmission is initiated when a plurality of masks (ones) are supplied to the line to act as a carrier. A start bit in the form of a space or zero is next transmitted followed by eight data bits and a stop bit in the form of a mask or one. Thus, ten bits are transmitted for each eigh bit character sent. The eight bit data byte is sent with the least significant bit first. Because the transmission is frequency shift keying, a first frequency is transmitted for the marks and a second frequency is transmited for the spaces. FSK data is transmitted serially and can include messages for polling remote premises units, requiring the remote premises units to report status or address information, acknowledging status or loop alarm information and remotely arming the remote premises units.

Figure 3:
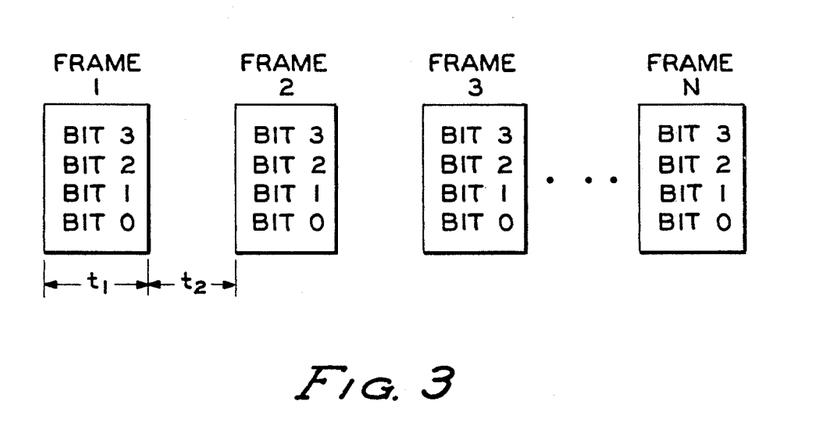
FIG. 3 shows the format for the information communicated by the remote premises to the central station.

The remote premises unit reports its status and alarm information in the format shown in FIG. 3. Transmission from the premises units utilizes DTMF (dual tone multifrequency) "touch tone" dialing frequencies used in standard telephone communication. The touch tone method uses eight separate frequencies divided into four frequencies representing a high frequency group and four frequencies representing a low frequency group. One tone is selected from each group and this tone pair is transmitted containing the four bits of parallel information. By sending a tone pair, security is built into the system since valid data requires the presence of one tone from the high group and one tone from the low group. The data is not valid if only one tone is sent, both tones are from the same group, or more than two tones are detected. In a typical system, in order to describe the status of the premise unit and to respond to various commands, more than four binary bits are required. Therefore, the DTMF data frames are transmitted serially, one frame at a time. The first tone pair, representing fou bits of data, is sent for a specified time period. The tone pair for the next four bits is sent for the same specified time period with a relaxation time therebetween to allow line energy to decrease so that the DTMF receiver can detect valid tones in the next frame.

Figure 4A:
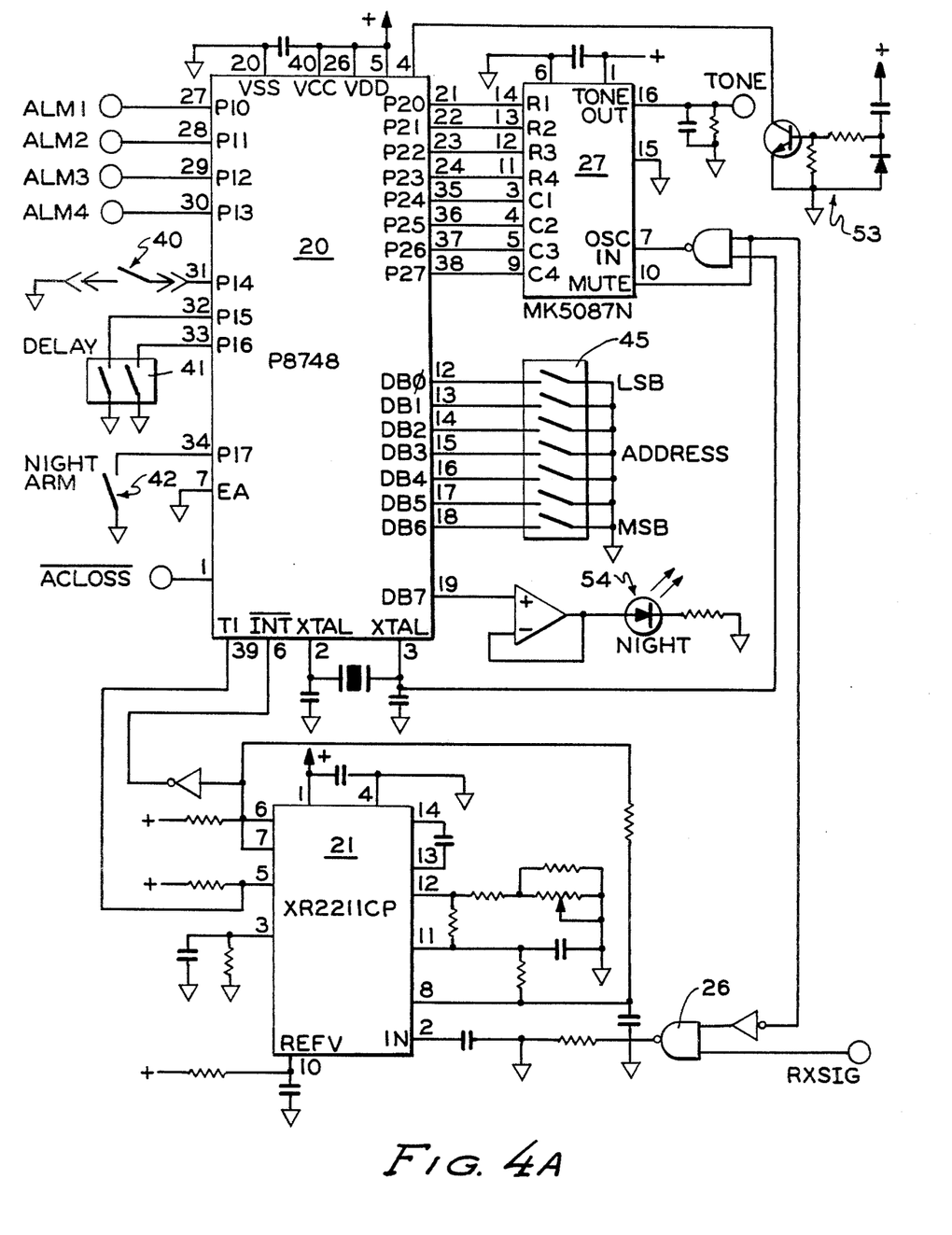
FIGS. 4A–4D are a schematic diagram showing a remote premises unit which can be used at the remote premises; and, FIGS. 5A–5I are a schematic diagram of the SCU interface located at the central station.
Figure 4B:
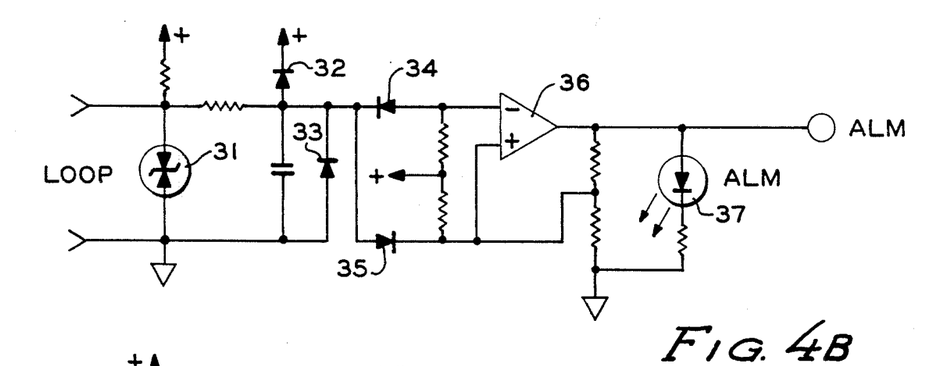
Figure 4C:
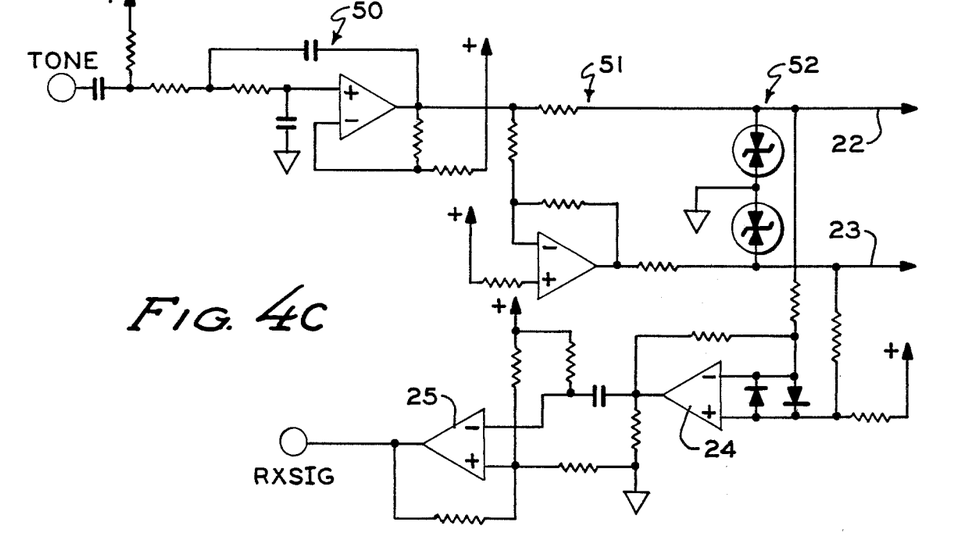
Figure 4D:
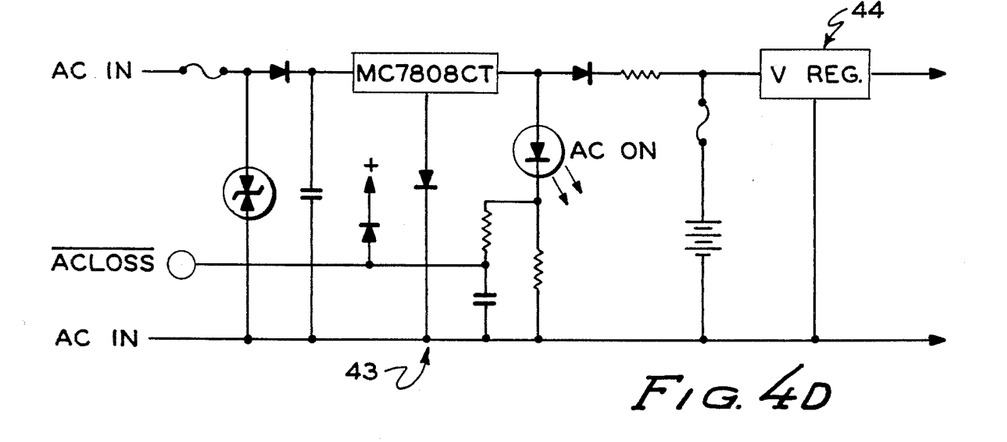

Burglar alarm unit 17 is shown in more detail in FIGS. 4A-4D. This unit is centered around microprocessor 20 which is connected to FSK demodulator 21 as shown. As shown in FIG. 4C, unit 17 is connected to CSU 16 over lines 22 and 23. Incoming FSK data is connected through sensitivity control amplifier 24 having diode input protection, and through squaring amplifier 25 to terminal RXSIG which is shown in FIG. 4A as being connected to one input of NAND gate 26. NAND gate 26 receives a second input from the mute output from tone encoder 27 which indicates that data is being transmitted by BAU 17 and will block FSK demodulator 21 through NAND gate 26 from processing its own data.

A typical message which is received from the central station and demodulated by FSK demodulator 21 is a polling message requiring BAU 17 to report the status of the four alarm loops to which microprocessor 20 may be connected. These alarm loops are shown connected to pins 27-30 of microprocessor 20. Each alarm input to the microprocessor is connected from a loop sensing circuit such as that shown in FIG. 4B. This circuit has a pair of input terminals connected to a particular loop which may consist of sensing switches for sensing burglary and fire conditions. Varistor 31 is included for protection of the loop sensing circuit and the incoming signal is clamped by diodes 32 and 33 before being supplied through threshold diodes 34 and 35. The alarm signal is connected through amplifier 36 and then to the corresponding input of microprocessor 20. Light emitting diode 37 will provide a visual indication of which loop is in alarm.

As mentioned previously, a corresponding loop sensing circuit such as that shown in FIG. 4B is connected to each alarm input of microprocessor 20 via pins 27-30. Also provided as inputs to microprocessor 20 are tamper detecting circuit 40, switches 41 which determine the amount of delay provided for the customer at his remote premises to exit the building after the night arm switch has been activated, night arming switch 42 activated by the customer to inform the central station that the remote premises has been vacated and, therefore, those door closures and openings which during daylight hours would have been normal are now abnormal, and an AC loss input provided at pin 1 from the circuit shown in FIG. 4D which shows battery charging circuit 43 and voltage regulator 44 for providing regulated voltage to the circuit shown in FIGS. 4A-4D. Voltage regulator 44 may be any suitable voltage regulator for providing regulated voltage to the circuit. Finally, input pins 12-18 are connected to a plurality of switches 45 for determining the address of the remote premises. Specifically, the address as established by switches 45 is used as a double check for security purposes. That is, since this system is in the form of a stepping switch format, the microprocessor at the central station will already know the identity of the station in which it is in communication. The reply message from the remote premises containing the address, therefore, will be checked to see if there is a match. If there is no match, then security has been breached.

The output from microprocessor 20 is taken at pins 21-24 and 35-38. Pins 21-24 select one frequency out of the low group of frequencies and pins 35-38 select one frequency from the high group of frequencies. For example, the low group frequenceis may be 687 Hz, 770 Hz, 852 Hz and 941 Hz and thehigh roup frequencies may be 1209 Hz, 1336 Hz, 1477 Hz and 1633 Hz. Since there are four frequencies in the low group and four frequencies in the high group and since each frame of four bits transmitted by the remote premises unit contains one frequency from the low group and one frequency from the high group, every combination of these four bits can be completely described. That is, with the eight frequencies provided at the remote premises unit, only four output lines at the central station are necessary for completely describing all combinations of these frequencies transmitted by the remote premises.

Microprocessor 20 determines the tone pair to make up the reporting frames from the remote premises units. The tone transmission is supplied over the tone terminal shown in FIG. 4A to the tone terminal shown in FIG. 4C. This tone transmission is supplied through low pass filter 50, line driver 51 and protection circuit 52 to terminals 22 and 23 which are in turn connected to CSU 16 for transmission over the two wires connected to secondary DSS 15, then through primary DSS 14 to the central station.

Circuit 53 of FIG. 4A provides a pulse to microprocessor 20 upon power up and LED 54 indicates that the remote premises are under night arming.

Figure 5A:
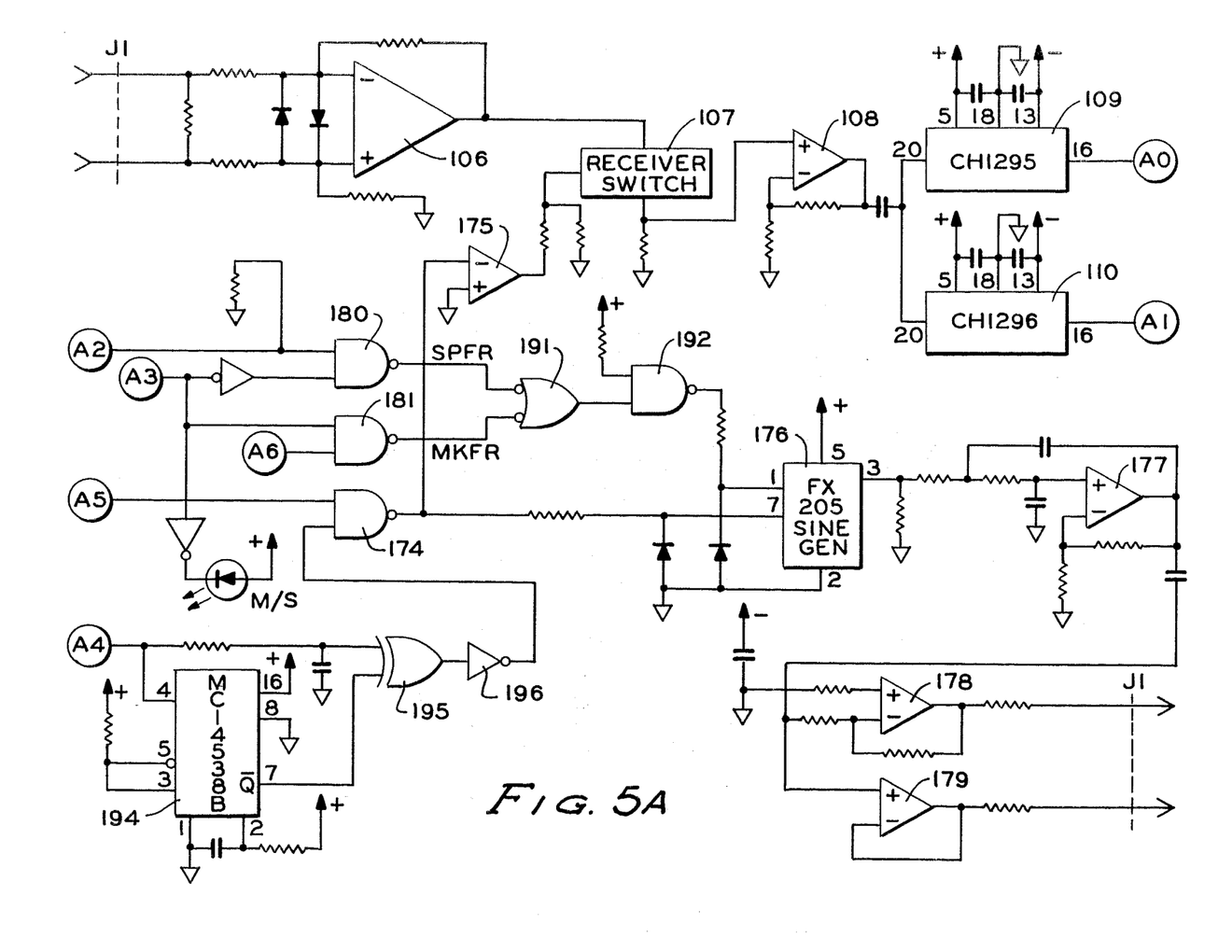
Figure 5B:
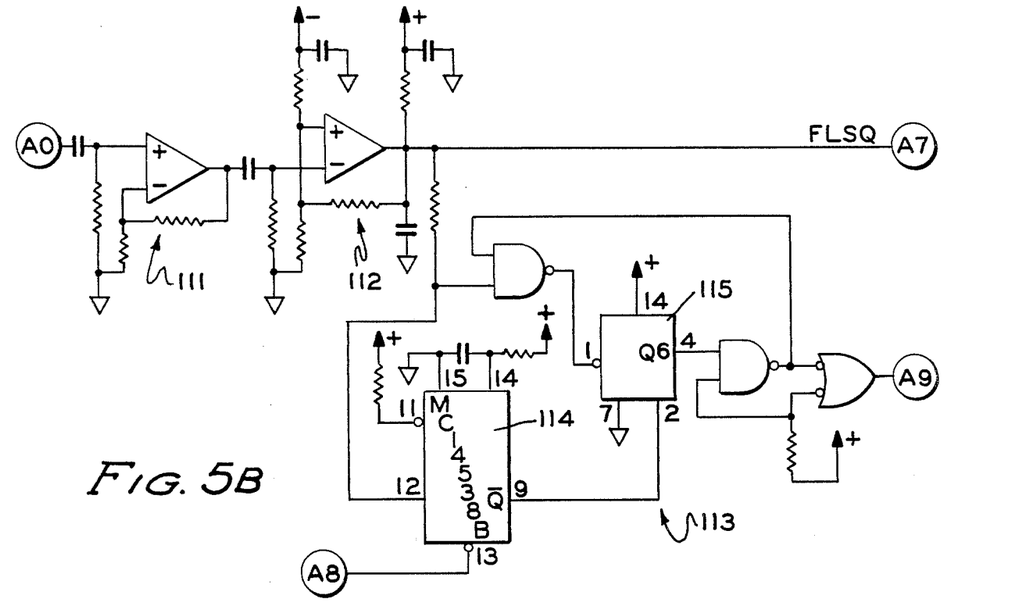

The tone transmission is connected through SCU 12 to SCU interface 11 shown in FIGS. 5A-5B. The terminals J1 in these figures represent the connection between SCU interface 11 and SCU 12, terminals P1 indicate the connection between SCU interface 11 and processor 10 and the circled terminals show the interconnection between FIGS. 5A-5I. As shown in FIG. 5I, each SCU has an address strap 100 comprising eight terminals connected to corresponding output terminals of decoder 101 and terminal 9 to which one of these eight terminals is connected. Specifically, in the first SCU interface, terminal 1 is connected to terminal 9; in the second, terminal 2 is connected to terminal 9; and so on. The SCU interface is selected by the microprocessor by providing an output over address lines A3-A6 and A7 which are decoded by 101 to energize one of the terminals 1-8. This operation provides an output at terminal 9 which is connected over terminal C2 to provide an enabling signal at the corresponding terminal in FIG. 5F through NAND gate circuit 102. This circuit, together with the signal on address line A2 will provide an enabling signal either to FSK transmitter 103 or, over terminal C6, to input/output port 104 and to NOR gate 105.

Figure 5C:
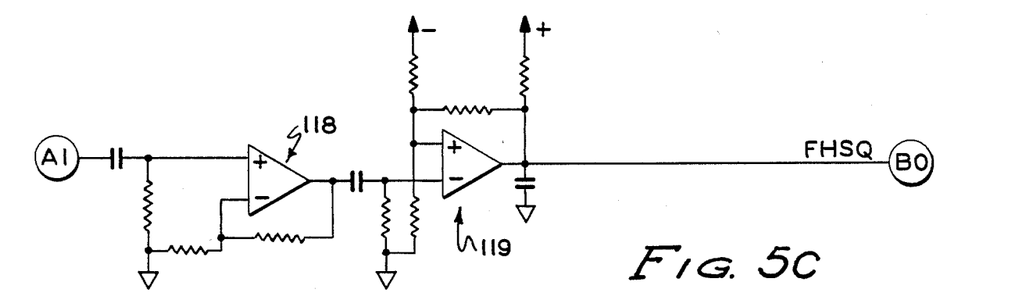
Figure 5D:
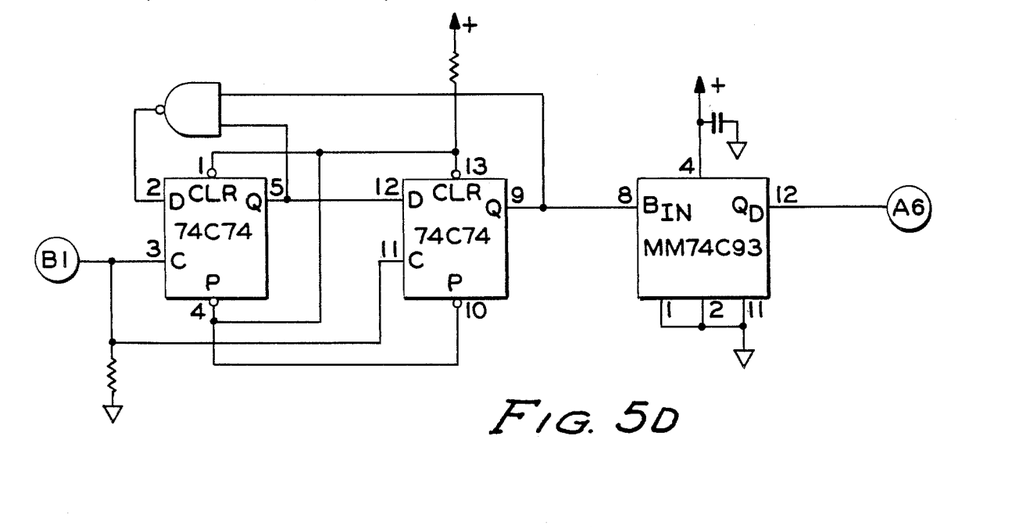
Figure 5E:
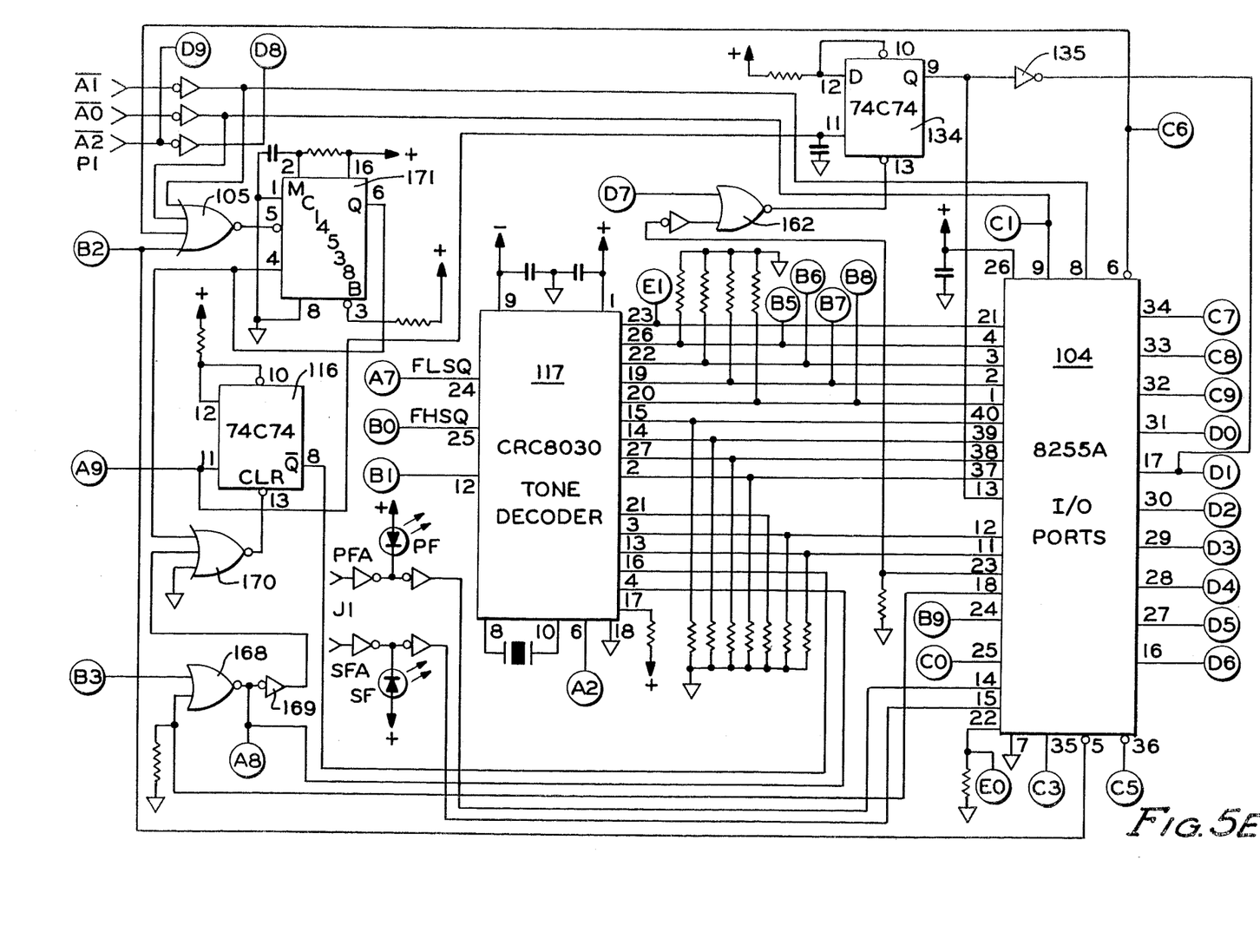
Figure 5F:
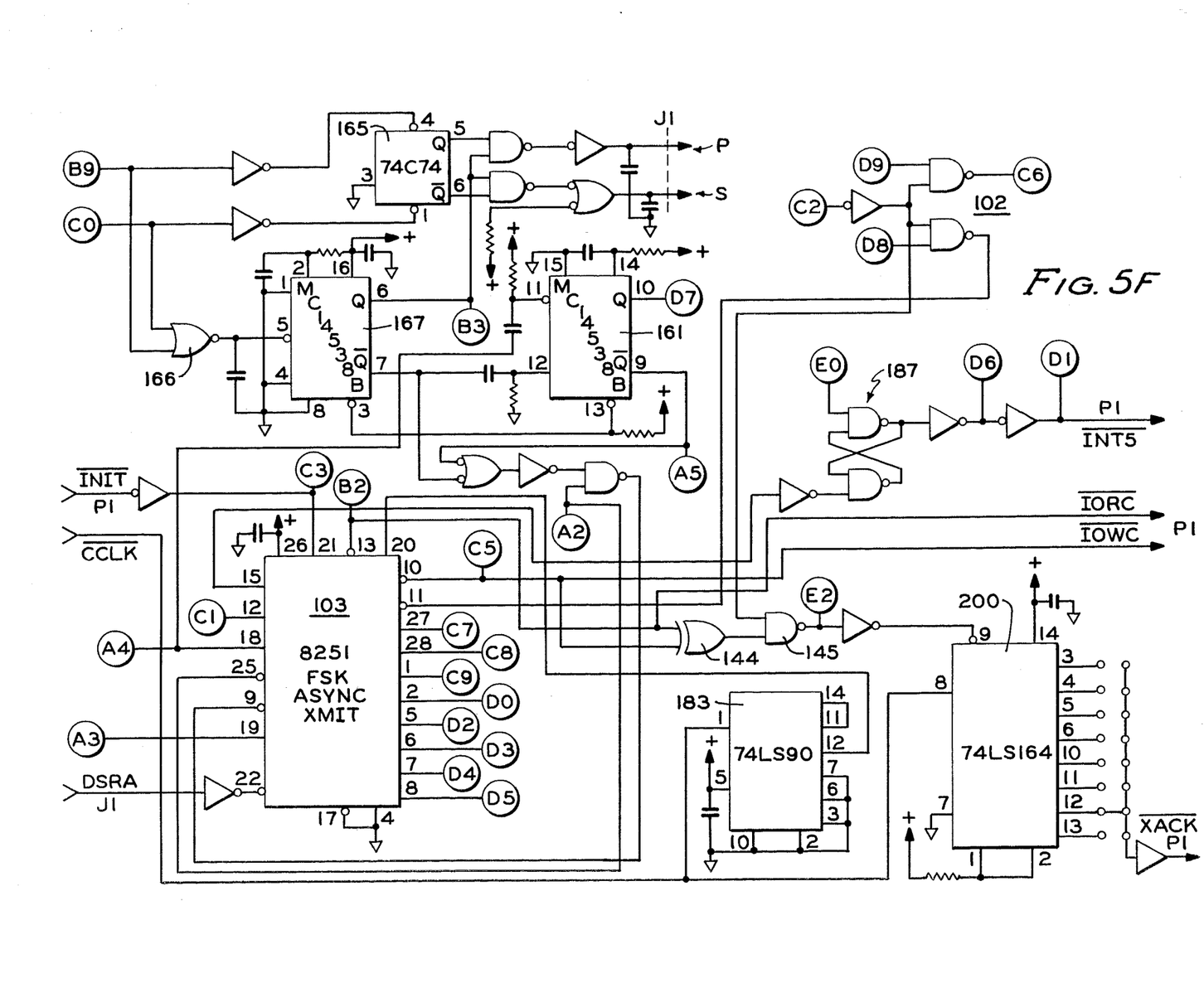
Figure 5G:
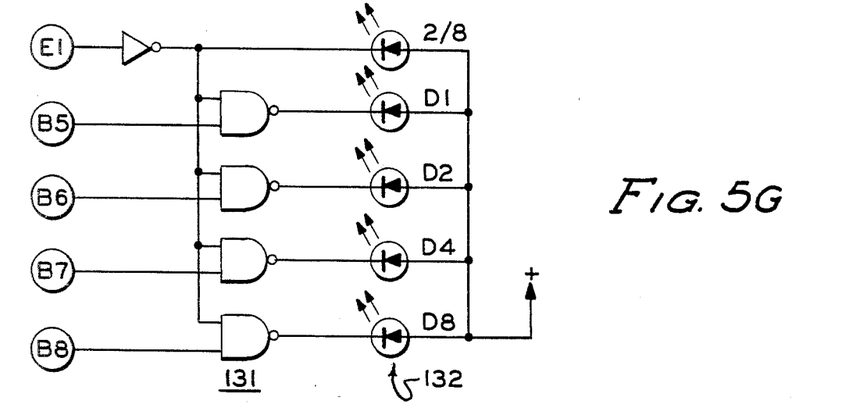
Figure 5H:
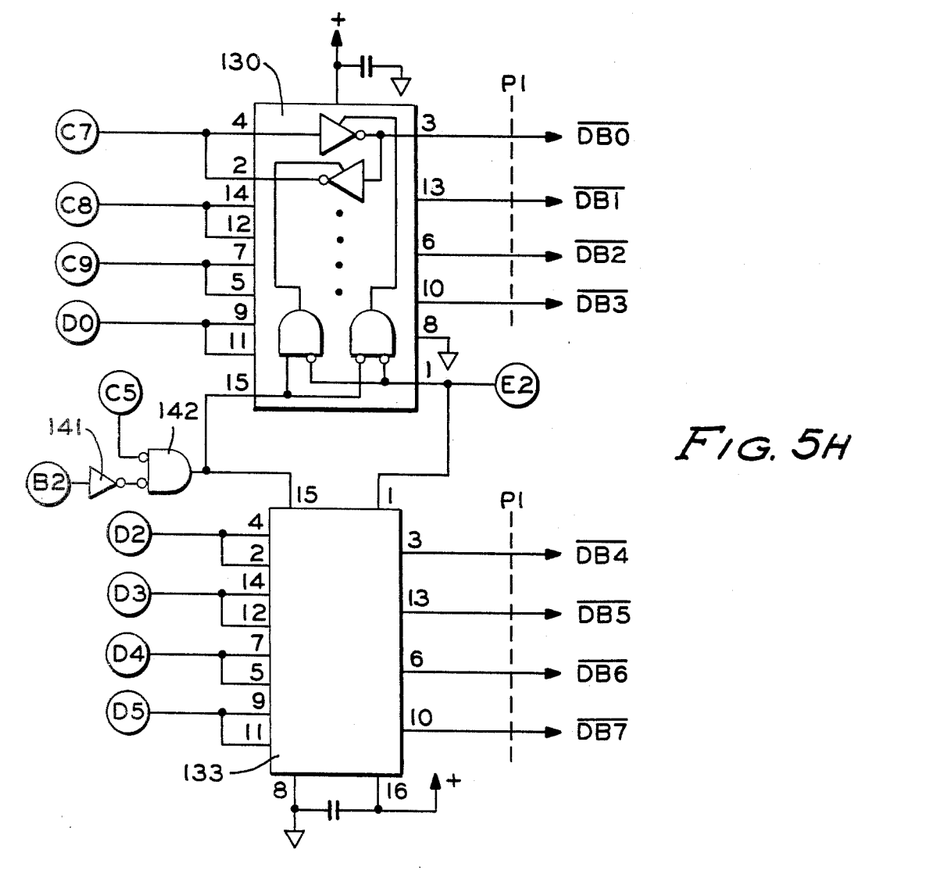
Figure 5I:
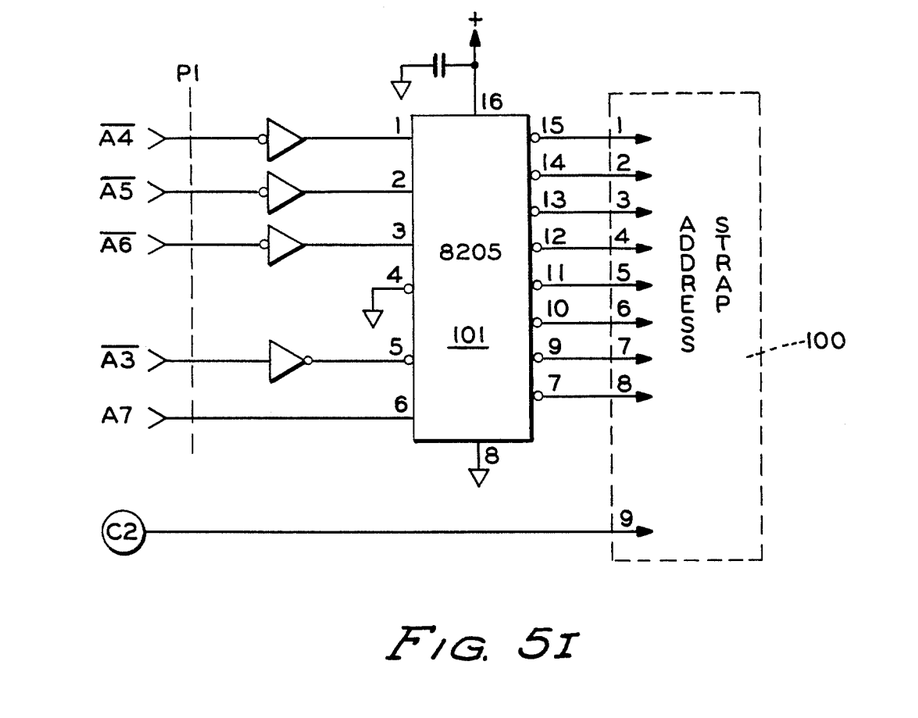

Thus, with the SCU interface shown in FIGS. 5A-5I enabled, the tone transmission is received by amplifier 106 (FIG. 5A) which converts the symmetrical differential input tone transmission to a single ended output to receiver switch 107. Receiver switch 107 is normally open during transmission so that SCU interface 11 will not process its own transmission. During the receive mode, receiver switch 107 is closed to connect the tone signal through to amplifier 108 and to the low group bandpass filter 109 and the high group bandpass filter 110. Low group bandpass filter 109 is designed to pass the four lower freqencies to its output terminal A0 and high g roup bandpass filter 110 is designed to pass the four higher frequencies to its output terminal A1. These terminals are shown in FIGS. 5B and 5C.

The low frequency is supplied through sensitivity gain control amplifier 111 and squaring and threshold circuit 112 before it is connected to terminal A7. At the same time, the tone transmission is connected through strobe generator 113 for providing a strobe pulse at terminal A9. The strobe generator is comprised of monostable multivibrator 114 and counter 115 for providing an output after a count of 32 to flip-flop 116 (FIG. 5E) which in turn provides a hold signal to tone decoder 117.

The high frequency is supplied to terminal A1 and then through sensitivity gain control amplifier 118 and threshold and squaring circuit 119 to output terminal B0.

The low frequency signal over A7 and the high frquency signal over B0 are connected as inputs to tone decoder 117 (FIG. 5E). Tone decoder 117 has two formats of operation. In one format, it provides a separate output over pins 26, 22, 19, 20, 15, 14, 27 and 2 each pin devoted to a specific frquency. In the more predominant method of operation when pin 23 is low, decoder 117 converts the low frequency tone and the high frequency tone received during the tone transmission into a four bit output word over pins 26, 22, 19 and 20 which completely describe the 16 combinations possible from selecting a low tone from a group of four low tones and a high tone from a group of four high tones.

These output pins from tone decoder 117 are connected to corresponding inputs of input/output port 104. When tone decoder 117 is operating in its predominant format of converting the tone transmission into a four bit parallel output, only output pins 34, 33, 32 and 31 are used for connecting this information through bidirectional buffer 130 (FIG. 5H) to microprocessor bus P1. These four bits are also connected to corresponding inputs of NAND gate circuit 131 (FIG. 5G) which receives an enabling input over terminal E1 when ecoder 117 is conditioned for four bit parallel operation rather than the eight output separation of tones. The four bit parallel word is then displayed on LEDs 132. Whe tone decoder 117 is used in the eight output format, buffer 133 is also used to connect the outputs from input/output port 104 to the data bus.

At the same time that the tone transmission is being decoded by tone decoder 117 and supplied through input/output port 104 to bidirectional bus driver 130, the strobe pulse also sets latch 134 which provides an interrupt signal through inverter 135 and terminal D1 to the interrupt terminal shown in FIG. 5F. When the microprocessor receives the interrupt, it can read the outputs from bidirectional bus driver 130 by using pins 5 and 36 of input/output port 104 over terminals B2 and C5 of FIG. 5E to corresponding terminals B2 and C5 in FIG. 5H, which operate on bus driver 130 through inverter 141 and NAND gate 142. Also used for this read operation is terminal E2 which is derived from FIG. 5F as a combination of terminals C5, B2 and the channel select input from terminal C2 through exclusion OR gate 144 and NAND gate 145.

Receive interrupt latch 134 is enabled by its pin 13. Terminal D7 of monostable multivibrator 161 (FIG. 5F) is normally low and pin 23 of input/output port 104 is normally high which provides a normally high signal from the output of NOR gate 162 for conditioning latch 134 to receive the next strobe pulse. When the strobe pulse was received, latch 134 switches to provide the interrupt signal which can be read by the microprocessor. When the microprocessor reads the interrupt, and reads the information on the output of the bidirectional bus drivers, it conditions inputoutput port 104 to reduce pin 23 to a low state which resets interrupt latch 134 so that it is in a condition to receive the next strobe pulse for providing an interrupt output. Each time a new frame is received by SCU interface 11, another interrupt is generated to inform the microprocessor that data bits are available to be read at terminal DB0-DB3 (FIG. 5H).

After the time period t2 as shown in FIG. 3 has passed and no additional frame has been received by SCU interface 11, the microprocessor by addressing input/output port 104 supplies a pulse either at output pin 24 or output pin 25 depending upon whether a primary or a secondary DSS is to be stepped. These pulses are connected through terminals B9 and C0 to flip-flop 165 (FIG. 5F) and through NOR gate 166 to trigger monostable multivibrator 167. When flip-flop 165 is switched, it determines whether a stepping pulse is to be supplied over output pin P or pin S depending upon whether the stepping pulse is a primary stepping pulse or a secondary stepping pulse. When monostable multivibrator 167 switches, it provides the stepping pulse which has been steered by latch 165.

The switching of monostable multivibrator 167 also provides a pulse through terminal B3, NOR gate 168 (FIG. 5E), inverter 169 and NOR gate 170 to reset hold flip-flop 116. Hold flip-flop 116 can also be reset by monostable multivibrator 171 which receives its input from address lines A1, A0 and A2 whenever the particular SCU interface 11 has been disabled at the time that processor 10 steps to the next SCU interface. When hold latch 116 is reset, it no longer holds the output from tone decoder 117.

Also, when monostable multivibrator 167 switches, it in turn triggers multivibrator 161 which provides a PREAMBLE output at terminal D7 to clear receive interrupt latch 134 and to provide a transmit enable pulse through terminal A5 and NAND gate 174 (FIG. 5A). The transmitter enable signal at the output of NAND gate 174 operates through amplifier 175 to open receiver switch 107 so that the signal transmitted by SCU interface 11 is not also received by it and supplied at terminals A0 and A1. The transmit enable signal at the output of NAND gate 174 also conditions sine wave generator 176 to begin supplying marks and spaces through wave shaper 177 and then to pins J1 connected to a corresponding SCU 12 through single ended to differential line drivers 178 and 179.

The space frequency is connected to NAND gate 180 by terminal A2 which is an output from tone decoder 117 and the mark frequency is provided through NAND gate 181 from terminal A6 which is shown in FIG. 5D. The circuit shown in FIG. 5D is designed to provide the mark frequency by using a clock terminal at B1 which is also supplied by tone decoder 117. The control of NAND gates 180 and 181 is from the transmit data terminal A3 which is an output terminal from the asynchronous transmitter 103. Transmitter 103 receives its input data over terminals C7-D0 and D2-D5 from bidirectional bus drivers 130 and 133 over data bit lines DB0-DB7. Transmitter 103 is conditioned to transmit by the card select pin 11 and the write select pin 10 and receives a clockd input at pin 20 from divider 183 (FIG. 5F) which divides down the basic clock signal from the microprocessor. When a word to be transmitted is loaded into transmitter 103, a transmit ready signal is supplied over pin 15 and through the transmit interrupt latch 187 for providing a transmit interrupt at the interrupt pin to the microprocessor and also to pin 16 of input/output port 104.

Transmitter 103 is then instructed to transmit by applying a signal over address line A0 to its pin 12. the data is then supplied out over pin 19 and through terminal A3 to NAND gates 180 and 181. When a data bit is a space, NAND gate 180 is enabled to pass the space frequency through OR gate 191 and NAND gate 192 to sine wave generator 176. When a mark data bit is to be transmitted, NAND gate 181 is enabled to pass the mark frequency at terminal A6 through OR gate 191 and NAND gate 192.

When the word stored in transmitter 103 has been transmitted, it supplies a signal out over pin 18 which is a transmit empty signal and is connected through terminal A4 to monostable multivibrator 194 (FIG. 5A) for supplying an output through EXCLUSIVE OR gate 195 and inverter 196 to change the state of the output of NAND gate 174 to disable sine wave generator 176 and to condition receiver switch 107 to receive data from a remote station. SCU interface 11 is now in condition for receiving the frames of information from the remote premises unit as described above. Finally, acknowledgment generator 200 provides an acknowledgmentsignal to the microprocessor that data has been successfully transferred to input/output port 104 or to FSK transmitter 103. The input to this generator is a clock signal from the microprocessor and the inputs over terminals C3 and B2 from input/output port 104. The firmware necessary for constructing the four bit parallel word as a single DTMF transmission from BAU 17 is attached as an appendix hereto.

The embodiments of the invention in which an exclusive property or right is claimed are defined as follows:

1. In a central station alarm reporting system having a central station connected to at least one remote premises unit over a communication channel, said remote premises unit having means for providing at least two high frequency signals and at least two low frequency signals and having transmitting means for transmitting at least two bits of parallel digital information in a single transmission, said single transmission comprised of at least one of said low frequency signals and at least one of said highfrequency signals, said at least two low frequency signals, said at least two low frequency signals and said at least two high frequency signals having at least four combinations for single transmissions, said central station comprising:
   receiving means for receiving said transmission from said remote premises unit; and,
   decoding means having an input connected to said receiving means and having at least two output lines for providing at least a two bit digital word capable of completely describing the at least four combinations of said at least two low and at least two high frequency signals.

2. The central station of claim 1 wherein said signals are tones.

3. The central station of claim 2 wherein said receiving means comprises a high pass filter and a low pass filter for separating said transmission into its high frequency tone and its low frequency tone, said input of said decoding means comprising a first input for receiving said high frequency tone and a second input for receiving said low frequency tone.

4. The central station of claim 3 wherein said receiving means further comprises a strobe unit connected to one of said filters for providing a strobe pulse upon receiving a tone.

5. The central station of claim 4 wherein said receiving means further comprises interrupt means connected to said strobe means for providing an interrupt signal upon receiving said strobe pulse.

6. The central station of claim 5 wherein said decoding means fruther comprises an FSK transmitter for transmitting FSK signals to said remote premises unit.

7. The central station of claim 6 wherein said receiving means further comprises a receive switch connected as an input to said high and low pass filters for blocking reception of signals when said FSK transmitter is transmitting FSK messages.

8. In a central station alarm reporting system having at least one remote premises unit for transmitting at least two bits of parallel information in a single transmission over a communication system to a central station, said central station having at least two output lines for providing at least a two bit digital word capable of completely describing all combinations of said single transmission, the remote premises unit comprising:
   alarm sensor means for sensing an alarm condition at the remote premises unit; and,
   transmission control means connected to said alarm sensor means and having means for providing at least two high frequencyf signals and at least two low frequency signals and having transmitting means for transmitting at least two bits of parallel digital alarm information in a single transmission, said single transmission comprised of at least one of said low frequency signals and at least one of said high frequency signals, said at least one of said low frequency signals and said at least one of said high frequency signals having at least four combinations for single transmissions.

9. The remote premises unit of claim 8 wherein said signals are tones.

10. The remote premises unit of claim 9 wherein said transmission control means comprises a tone encoder having at least four inputs, one each for said at least two high frequencies and one each for said at least two low frequencies.

11. The remote premises unitof claim 10 wherein said transmission control means comprises microprocessing means having an input connected to said alarm sensor means and at least four outputs, a corresponding one for each input of said tone encoder.

12. The remote premises unit of claim 11 wherein said transmission control means comprises a transmitter connected to said tone encoder for transmitting said single transmission to said central station.

13. The remote premises unit of claim 12 further comprising a receiver for receiving FSK messages transmitted by said central station and an FSK decoder for converting said FSK messages into digital format.

14. The remote premises unit of claim 13 wherein said microprocessing means has address inputs for providing address information to be transmitted to said central station.

15. The remote premises unit of claim 13 wherein said microprocessing means comprises plural inputs connected to plural alarm sensor means.

16. In a central station alarm reporting system having a central station connected to at least one remote premises unit over a communication channel, said remote premises unit having means for providing at least four high frequency signals and at least four low frequency signals and having transmitting means for transmitting at least four bits of parallel digital information in a single transmission, said single transmission comprised of at least one of said low frequency signals and at least one of said high frequency signals, said at least one of said low frequency signals and said at least one of said high frequency signals having at least sixteen combinations for single transmissions, said central station comprising:
receiving means for receiving said transmission from said remote premises unit; and,
decoding means having an input connected to said receiving means and having at lest four output lines for providing a digital word capable of completely describing the at least sixteen combinations of said at least four low and at least four high frequency signals.

17. The central station of claim 16 wherein said signals are tones.

18. The central station of claim 17 wherein said receiving means comprises a high pass filter and a low pass filter for separating said transmission into its high frequency tone and its low frequency tone, said input of said decoding means comprising a first input for receiving said high frequency tone and a second input for receiving said low frequency tone.

19. The central station of claim 18 wherein said receiving means further comprises a strobe unit connected to one of said filters for providing a strobe pulse upon receiving a tone.

20. The central station of claim 19 wherein said receiving means further comprises interrupt means connected to said strobe means for providing an nterrupt signal upon receiving said strobe pulse.

21. The central station of claim 20 wherein said decoding means further comprises an FSK transmitter for transmitting FSK signals to said remote premises unit.

22. The central station of claim 21 wherein said receiving means further comprises a receive switch connected as an input to said high and low pass filters for blocking reception of signals when said FSK transmitter is transmitting FSK messages.

23. In a central station alarm reporting system having at least one remote premises unit for transmitting at least four bits of parallel information in a single transmission over a communication system to a central station, said central station having at least four output lines for providing at least a four bit digital word capable of completely describing all combinations of said signal, the remote premises unit comprising:
alarm sensor means for sensing an alarm condition at the remote premises; and,
transmission control means connected to said alarm sensor means, said transmission control means having means for providing at least four high frequency signals and at least four low frequency signals and having transmitting means for transmitting at least four bits of parallel digital information in a single transmission, said single transmission comprised of at least one of said low frequency signals and at least one of said high frequency signals, said at least one of said low frequency signals and said at least one of said high frequency signals having at least sixteen combinations for single transmissions.

24. The remote premises unit of claim 23 wherein said signals are tones.

25. The remote premises unit of claim 24 wherein said transmission control means comprises a tone encoder having at least eight inputs, one each for said at least four high frequencies and one each for said at least four low frequencies.

26. The remote premises unit of claim 25 wherein said transmission control means comprises microprocessing means having an input connected to said alarm sensor means and at least eight outputs, a correspondng one for each input of said tone encoder.

27. The remote premises unit of claim 26 wherein said transmission control means comprises a transmitter connected to said tone encoder for transmitting said single transmission to said central station.

28. The remote premises unit of claim 24 further comprising a receiver for receiving FSK messages transmitted by said central station and an FSK decoder for converting said FSK messages into digital format.

29. The remote premises unit of claim 28 wherein said microprocessing means has address inputs for providing address information to betransmitted to said central station.

30. The remote premises unit of claim 29 wherein said microprocessing means comprises plural inputs connected to plural alarm sensor means.

31. A central station alarm reporting system comprising:
a transmission channel for transmitting messages bidirectionally which are supplied to it;
at least one remote premises unit connected to said transmission channel system and comprising alarm sensor means for sensing an alarm condition at the remote premises,
transmission control means connected to said alarm sensor means, said transmission control means having means for providing at least four high frequency signals and at least four low frequency signals and having transmitting means for transmitting at least four bits of parallel digital alarm information in a single transmission, said single transmission comprised of at least one of said low frequency signals and at least one of said high frequency signals, said at least one of said low frequency signals and said at least one of said high frequency signals having at least sixteen combinations for single transmissions; and, a central station connection to said transmission channel system and comprising receiving means for receiving said transmission from said remote premises unit, and decoding means having an input connected to said receiving means and having at least four output lines for providing a digital word capable of completely describing the at least sixteen combinations of said at least four low and at least four high frequency signals.

32. The system of claim 31 wherein said signals are tones.

33. The remote premises unit of claim 32 wherein said transmission control means comprises a tone encoder having at least eight inputs, one each for said at least four high frequencies and one each for said at least four low frequencies.

34. The remote premises unit of claim 33 wherein said transmission control means comprises microprocessing means having an input connected to said alarm sensor means and at least eight outputs, a corresponding one for each input of said tone encoder.

35. The remote premises unit of claim 34 wherein said transmission control means comprises a transmitter connected to said tone encoder for transmitting said single transmission to said central station.

36. The remote premises unit of claim 35 further comprising a receiver for receiving FSK messages transmitted by said central station and an FSK decoder for converting said FSK messages into digital format.

37. The remote premises unit of claim 36 wherein said microprocessing means has address inputs for providing address information to be transmitted to said central station.

38. The remote premises unit of claim 37 wherein said microprocessing means comprises plural inputs connected to plural alarm sensor means.

39. The central station of claim 38 wherein said receiving means comprises a high pass filter and a low pass filter for separating said transmission into its high frequency tone and its low frequency tone, said input of said decoding means comprising a first input for receiving said high frequency tone and a second input for receiving said low frequency tone.

40. The central station of claim 39 wherein said receiving means further comprises a strobe unit connected to one of said filters for providing a strobe pulse upon receiving a tone.

41. The central station of claim 40 wherein said receiving means further comprises interrupt means connected to said strobe means for providing an interrupt signal upon receiving said strobe pulse.

42. The central station of claim 41 wherein said decoding means further comprises an FSK transmitter for transmitting FSK signals to said remote premises unit.

43. The central station of claim 42 wherein said receiving means further comprises a receive switch connected as an input to said high and low pass filters for blocking reception of signals when said FSK transmitter is transmitting FSK messages.

44. The central station of claim 32 wherein said receiving means comprises a high pass filter and a low pass filter for separating said transmission into its high frequency tone and its low frequency tone, said input of said decoding means comprising a first input for receiving said high frequency tone and a second input for receiving said low frequency tone.

45. The central statin of claim 44 wherein said receiving means further comprises a strobe unit connected to one of said filters for providing a strobe pulse upon receiving a tone.

46. The central station of claim 45 wherein said receiving means further comprises interrupt means connected to said strobe means for providing an interrupt signals upon receiving said strobe pulse.

47. The central station of claim 46 wherein said decoding means further comprises an FSK transmitter for transmitting FSK signals to said remote premises unit.

48. The central station of claim 47 wherein said receiving means further comprises a receive switch connected as an input to said high and low pass filters for blocking reception of signals when said FSK transmitter is transmitting FSK messages.

* * * * *

UNITED STATES PATENT OFFICE
CERTIFICATE OF CORRECTION

PATENT NO. : 4,342,986
DATED : August 3, 1982
INVENTOR(S) : Allan F.V. Buskirk et al It is certified that error appears in the above-identified patent and that said Letters Patent are hereby corrected as shown below:

Claim 8, line 57, change "frequencyf" to --frequency--.

Claim 16, line 42, change "lest" to --least--.

Claim 20, line 62, change "nterrupt" to --interrupt--.

Claim 28, line 42, change "24" to --27--.

Claim 29, line 49, change "betransmitted" to --be transmitted--.

Claim 45, line 29, change "statin" to --station--.

Signed and Sealed this

Sixteenth Day of November 1982

[SEAL]

Attest:

Attesting Officer

GERALD J. MOSSINGHOFF

Commissioner of Patents and Trademarks